United States Patent Office 3,816,575
Patented June 11, 1974

3,816,575
METHOD FOR PREPARING A POROUS THERMOPLASTIC RESIN SHEET
Rinnosuke Susuki, Tokyo, Hiroshi Hoshi, Narashino, Jiro Saito, Tokyo, Keiichi Murakami, Sendai, and Humio Ito, Ichikawa, Japan, assignors to Lion Fat & Oil Co., Ltd., Tokyo, Japan
No Drawing. Continuation of abandoned application Ser. No. 842,385, July 16, 1969. This application Sept. 10, 1971, Ser. No. 179,595
Claims priority, application Japan, July 22, 1968, 43/51,217; Sept. 7, 1968, 43/64,447; Dec. 2, 1968, 43/87,594; Dec. 21, 1968, 43/93,870
The portion of the term of the patent subsequent to May 2, 1989, has been disclaimed
Int. Cl. B29d 7/20
U.S. Cl. 260—49                                  5 Claims

ABSTRACT OF THE DISCLOSURE

A method for preparing a porous thermoplastic resin sheet comprising the processing steps of: forming a sheet with a composition containing thermoplastic resin kneaded together with acid-soluble inorganic particles and then soaking the sheet thus obtained in a treating liquid consisting of acid aqueous solution for dissolution of said inorganic particles out of said sheet.

---

This is a continuation of application Ser. No. 842,385, filed July 16, 1969, now abandoned.

BACKGROUND OF THE INVENTION

The present invention relates to a method for preparing a porous thermoplastic resin sheet, and more particularly relates to a method for porosifying a thermoplastic resin sheet.

It is well known that a thermoplastic resin sheet can be made gas-permeable and suitable for drawing as well as printing, once it is porosified. The conventional method for preparing a porous thermoplastic resin sheet comprises the processing steps such as adding a volatile liquid epispastic such as an aromatic hydrocarbon to a material resin, or kneading a powdered epispastic such as azobisisobutyronitrile together with a material resin, and then extruding and stretching said composition so as to define a form of sheet by an extruding method or a calendering method.

In the case of a conventional method as above-described, the produced sheet becomes comparatively high in price, as the epispastic used is very costly.

Furthermore, the conventional method has some troublesome problems, namely, that when a liquid epispastic as aforestated is utilized, a cautious treatment is always needed because of its inflammability and, when a powdered epispastic such as azobisisobutyronitrile is utilized, a continuous caution must be exercised against the poisonous substances generated during its vesication.

SUMMARY OF THE INVENTION

One of the objects of the present invention is to provide a method for porosifying a thermoplastic polyolefinic resin sheet without utilization of such an epispastic as aforementioned. The present invention forms a porous resin sheet by successive processing steps of kneading fine particles of an acid-soluble inorganic substance into thermoplastic polyolefin resin, forming a sheet of said composition and then soaking the thus obtained sheet in an inorganic acid aqueous solution for dissolving out said inorganic particles from said sheet.

As the acid-soluble inorganic particles employed in the present invention, there can be enumerated calcium sulfite, calcium sulfate, calcium phosphate, barium carbonate, zinc oxide, etc., as typical examples and, further, other inorganic particles can be also utilized, so long as they are soluble in an acid aqueous solution as mentioned hereafter. It is needless to say that, even though it is nonsoluble to acid, an inorganic particle can be kneaded within said resin as a filler.

The quantity of inorganic particles to be kneaded within a thermoplastic resin should be 20–90% by weight of the resultant composition. The grain size of the inorganic particles should be determined in consideration of the desired porosity for the porous sheet and further should be selected properly relative to the quantity to be added, and it should be less than 200 microns and more preferably less than 5 microns.

As the acid for use in dissolving the inorganic particle kneaded within the resin, there can be enumerated nitric acid, sulfuric acid, hydrochloric acid, phosphoric acid, sulfurous acid and mixtures thereof, and these acids are to be used in the form of aqueous solutions.

In a preferred embodiment of the present invention, calcium sulfite is utilized as the inorganic particles and a hydrochloric acid solution is used as the treating liquid for dissolving out said inorganic particles from said sheet.

Since calcium hydroxide is obtained as a by-product when acetylene is produced from a raw material of carbide, while sulfur dioxide is obtained as waste gas during petroleum refining processes, calcium sulfite can be prepared at a low cost by a reaction between calcium hydroxide and sulfur dioxide.

In an alternative preferred embodiment of the present invention, a cationic surface active agent is added to a treating liquid for soaking of the resin sheet prepared by kneading the calcium sulfite particles with the resin. The existence of a cationic surface active agent in the treating liquid expedites dissolving out the calcium sulfite particles from said resin sheet and effectuates their dissolution completely.

In addition, utilization of a cationic surface active agent makes it possible to dissolve out calcium sulfite particles contained within a sheet of a thickness of more or less than 5 mm. Accordingly, a thermoplastic resin sheet can be easily made gas-permeable just like synthetic leather due to this method.

As the cationic surface active agent, it is recommended to use one that is not soluble within the acid aqueous solution, for example quaternary ammonium halides such as dodecyltrimethylammonium chloride, octadecyldimethylbenzylammonium chloride, dioctadecyldimethylammonium chloride, etc., or alkylpyridinium halide such as hexadecylpyridinium chloride, etc.

Since all of these surface active agents are acid-proof, there is no need for changing the property of the treating liquid as dissolution develops, and a concentration of 0.1 to 1.0% by weight of said surface active agent is most suitable.

Although it is not necessarily impossible to employ a nonionic surface active agent, an anionic surface active agent, an amphoteric surface active agent, they are not good in practical use, because they become soluble as a result of co-existence for a long period within the acid.

The dissolution of said inorganic particles can be conducted at normal (room) temperature, however, it is advantageous to heat the treating liquid up to a higher temperature, because dissolution is accelerated without any damage of the sheet material itself.

When calcium sulfite is utilized as the inorganic particles to be kneaded within the thermoplastic resin, sulfur dioxide aqueous solution, namely sulfurous acid aqueous solution can be used as a treating liquid according to the present invention. This aqueous solution is capable of converting calcium sulfite to hydrocalcium sulfite which is dissolved out into said solution.

By adding therein calcium hydroxide, an aqueous solution of the thus obtained hydrocalcium sulfite forms calcium sulfite, and accordingly said calcium sulfite can be kneaded together within thermoplastic resin for recycled utilization.

When a sulfur dioxide aqueous solution is used as a treating liquid, a method for porosifying a resin sheet, according to the present invention, comprises the processing steps of:

(a) forming the thermoplastic resin into a sheet after kneading therein calcium sulfite including partially recycled calcium sulfite as afore-mentioned,
(b) soaking the thermoplastic resin sheet thus obtained into water and blowing gaseous sulfur dioxide therein for converting calcium sulfite within said sheet to hydrocalcium sulfite which is then dissolved out into the water so as to porosify said sheet,
(c) adding calcium hydroxide to the hydrocalcium sulfite aqueous solution obtained during step (b) for conversion of hydrocalcium sulfite to calcium sulfite,
(d) recycling the thus obtained calcium sulfite into step (a).

As described above, it is preferable that calcium sulfite is employed as the inorganic particles to be kneaded within the thermoplastic resin and hydrochloric acid aqueous solution is used as the treating liquid. However, in this preferred embodiment of the present invention, in some cases it is also preferable in connection with the utilization of the sheet that calcium sulfate particles are employed together with calcium sulfite.

Some of the calcium sulfate, which is not as easily soluble in hydrochloric acid, remains within the sheet even after treatment so as to eliminate the directional stretching characteristic or to contribute to preventing overstretching of the sheet, and, further, makes easy an adjustment of the weight of sheet.

An adequate quantity of calcium sulfite to be used should be less than 90% by weight of the mixture consisting of calcium sulfate and calcium sulfite.

Thus, the present invention provides a method for porosifying a thermoplastic resin sheet comprising the processing steps of:

(a) blowing gaseous sulfur dioxide into calcium hydroxide aqueous suspension in order to obtain calcium sulfite,
(b) forming a sheet with said resin after kneading calcium sulfite particles within the thermoplastic resin,
(c) soaking the resin sheet thus obtained in hydrochloric acid aqueous solution so as to dissolve out calcium sulfite particles for porosifying said resin sheet, meanwhile converting the thus dissolved calcium sulfite into the sulfur dioxide and calcium chloride,
(d) collecting sulfur dioxide thus obtained for recycling in a step (a) and, on the other hand, conducting the reaction between the thus obtained calcium chloride and sulfuric acid in order to obtain calcium sulfate and hydrogen chloride,
(e) kneading the thus obtained calcium sulfate within the thermoplastic resin together with calcium sulfite in the same manner as for the step (b), and causing said hydrogen chloride to be absorbed into the hydrochloric acid aqueous solution of the step (c).

For forming a sheet according to the present invention, conventional methods can be employed too. The extrusion method, the calendering method and the inflation method, the latter of which utilizes a die of the fishtail type or the manifold type, are well known in general for forming a sheet.

It is also practicable that said resin can be kneaded together with an antistatic agent, a discoloration-preventive agent, plasticizer, desired pigments and a viscosity-improver, besides the afore-stated acid-soluble inorganic particles.

Since the quantity of inorganic particles to be kneaded within thermoplastic resin, according to the present invention, is comparatively large, a rubber, for instance ethylene-propylene rubber, should be preferably added to said resin as a viscosity-improver, so as to make it possible to form a sheet without any difficulty.

A sheet thus formed is subjected to a treatment for dissolving the inorganic particles, after a conventional process for heat finishing as well as rolling up. The sheet can be cut to suitable dimensions prior to the above treatment or after it.

Said treatment for dissolving the inorganic particles is conducted by soaking the sheet in a treating liquid for 5 to 20 hrs., when the liquid temperature is normal (room temperature), and for 0.1–2 hrs. when the liquid temperature is 100° C.

However, when a cationic surface active agent is present in the treating liquid as above-described, the time for soakage can be shortened to one-fifth or so. The acid density in the treating liquid should preferably be 2 to 15%. After being porosified by soakage within a treating liquid, then said sheet is placed in contact with an alkali solution such as sodium hydroxide aqueous solution for neutralization of acid fixed upon the surface of said sheet. Then said sheet is dried in a forced draught and there is obtained a porous thermoplastic resin sheet as desired.

A sheet prepared in accordance with the method of the present invention has innumerable holes, which are irregularly arranged and succeeding one another within said sheet, and a microscopic unevenness is also defined on the surface of the sheet so that the light permeability is quite small and on the contrary light reflection is quite large. Further, said sheet is not expandable as is a conventional sheet, but rather it is firm like a conventional paper.

Furthermore, the microscopic unevenness of the surface deprives same of the brightness, which is customary in thermoplastic resin sheets, so that said sheet has a soft look and also can be written, drawn or printed on.

DESCRIPTION OF THE PREFERRED EMBODIMENTS

Example 1

Compounding ratio:
  Polyethylene (commercially available, prepared at medium low pressure): 27% by weight
  Ethylene-propylene rubber: 2.7% by weight
  $CaSO_3 \cdot \frac{1}{2} H_2O$ (grain size: 1μ): 70.3% by weight
Thickness of sheet: 0.2 mm.
Condition of acid treatment:
  Kind of acid: nitric acid
  Acid density: 10% by weight aqueous solution
  Temperature: about 20° C.
  Treating time: 20 hrs.
Condition of neutralization:
  Alkali density: aqueous solution including 5% by weight of sodium hydroxide.

As the result of a treatment conducted under the above-mentioned conditions, the dissolution of all calcium sulfite particles, which were kneaded within the resin sheet, was thoroughly done so that a sheet having successive holes measuring 1μ in diameter was obtained. In comparison with an oxide with a thickness of 0.2 mm, the sheet thus obtained has the same gas permeability as the oxide. Furthermore, an examination of the roughness of its surface by drawing with a pencil whose hardness was graded as HB, showed that the roughness proved good for drawing.

Example 2

Compounding ratio:
   Polyethylene (commercially available, prepared at medium low pressure): 27% by weight
   Ethylene-propylene rubber: 2.7% by weight
   $CaSO_3 \cdot \frac{1}{2}H_2O$ (grain size: 1μ): 70.3% by weight
Thickness of sheet: 0.2 mm.
Condition of acid treatment:
   Kind of acid: hydrochloric acid
   Acid density: 10% aqueous solution
   Temperature: 100° C.
   Treating time: 10 minutes
Condition of neutralization:
   Alkali density: aqueous solution including 5% by weight of sodium hydroxide.

As the result of a treatment conducted under the above-mentioned conditions, the dissolution of all of calcium sulfite particles, which were kneaded within the resin sheet, was done completely so that a sheet having successive holes measuring 1μ in diameter was obtained. The thus obtained sheet has a gas permeability and surface roughness just the same as the sheet according to Example 1.

Example 3

Compounding ratio:
   Polyethylene (commercially available, prepared at medium low pressure): 27% by weight
   Ethylene-propylene rubber: 2.7% by weight
   $CaSO_4 \cdot 2H_2O$ (grain size, 5μ): 70.3% by weight
Thickness of sheet: 0.2 mm.
Condition of acid treatment:
   Kind of acid: nitric acid
   Acid density: 10% aqueous solution
   Temperature: 100° C.
   Treating time: 15 minutes
Condition of neutralization:
   Alkali density: aqueous solution including 5% by weight of sodium hydroxide.

As the result of a treatment conducted under the above-mentioned conditions, the dissolution of all calcium sulfate fite particles, which were kneaded within the resin sheet, done completely so that a sheet having successive holes measuring 1μ in diameter was obtained. The thus obtained sheet proved to be better in gas-permeability than that of Example 1, and also had the same surface roughness as the sheet of Example 1.

Example 4

Compounding ratio:
   Polyethylene (commercially available, prepared at medium low pressure): 25% by weight
   Ethylene-propylene rubber: 3.0% by weight
   $CaSO_4 \cdot 2H_2O$ (grain size, 5μ): 36.0% by weight
   $CaSO_3 \cdot \frac{1}{2}H_2O$ (grain size, 1μ): 36.0% by weight
Thickness of sheet: 0.2 mm.
Condition of acid treatment:
   Kind of acid: hydrochloric acid
   Acid density: 10% aqueous solution
   Temperature: 100° C.
   Treating time: 15 minutes
Condition of neutralization:
   Alkali density: aqueous solution including 5% by weight of sodium hydroxide.

As the result of a treatment conducted under the above-mentioned conditions, the dissolution of all calcium sulfite particles and gypsum particles was sucessfully done so well that a sheet having successive holes measured 1 to 5μ in diameter was obtained.

Example 5

A composition of 29.5 parts by weight of polyethylene prepared at medium low pressure (commercially available) and 70.5 parts by weight of calcium sulfite was processed by a calender method ultilizing a twin-roll testing device (roll diameter, 89 mm., revolution ratio, 1:1.2) and thereby was prepared a sheet having thickness of 0.2 mm. The thus obtained sheet was cut into test pieces with the dimensions of 10 cm. x 8 cm. and then was soaked in an acid solution heated to a temperature of 100° C., said acid solution having 0.5% density of dodecyltrimethylammonium chloride and 10% density of hydrochloric acid. After two minutes soaking, said sheet was picked up from said acid liquid and then was neutralized within an aqueous solution of 5% by weight of sodium hydroxide. Then, after being washed in water, it was dried so as to obtain a finished product.

The thus prepared product looks just like a Kent paper and is rich in toughness and thereby, is quite suitable for writing or drawing, as it is.

Example 6

A sheet prepared with the same composition as Example 5 was treated by passing same through an acid solution, a neutralizing liquid and water for washing, all of which had the same composition as the preceding example. Said sheet was kept heated all through the process without being cut in pieces.

In this case, the acid treatment, whose time was adjusted to two minutes, resulted in a product having the same or better properties as the product of the preceding example.

Example 7

After treating a composition of 30% by weight of polyethylene (commercially available, prepared at medium low pressure), 21% by weight of calcium sulfite and 49% by weight of calcium sulfate by the calender method utilizing the same device as Example 5, a sheet thus obtained was cut into pieces with dimensions of 10 cm. x 8 cm. for soaking within the afore-stated solution. After 5 minutes soaking, said pieces of sheet were removed from said solution and were neutralized in turn with an aqueous solution of 5% by weight of sodium hydroxide. Then they were washed in water and dried to obtain finished products. The thus prepared products are, in nature, very good for writability especially for pencil.

Example 8

By treating a composition of 20 parts by weight of polyethylene (commercially available, prepared at medium low pressure) and 80 parts by weight of calcium sulfite in the same manner and utilizing the same device as Example 7, a product was obtained whose characteristics are the same as the product of Example 5.

Example 9

By treating a composition of 40 parts by weight of polyethylene (commercially available, prepared at medium low pressure) and 60 parts by weight of calcium sulfite in the same manner of processing and acid treatment as Example 7, there was obtained a product whose characteristics are the same as the product of Example 5.

Example 10

(a) Conditions for preparing a polyolefin sheet:
   Compounding ratio:
      Polyethylene (commercially available, prepared at medium low pressure): 27.0% by weight
      Calcium sulfite (grain size: 1.0–3.0μ): 70.5% by weight
      Ethylene-propylene rubber: 2.5% by weight Utilized rolls:
  Diameter of the rolls: 90 mm.; length, 200 mm.
  Revolution ratio: 1.2
  Temperature on the surface of rolls: 160±5° C.
  Roll clearance: 0.2 mm.
  Thickness of sheet, 0.2 mm.
(b) Condition for dissolution of calcium sulfite:
  Dimension of sheet: width, 150 mm.; thickness, 0.2 mm.
  Reaction tank: 200 x 400 x 200 mm.
  Quantity of SO₂ to be blown in: 0.4 liter/min.
  Time for soaking: 20–30 minutes
  Temperature: 10–20° C.
  Dissolution ratio: 98.5% of calcium sulfite included therein
(c) Condition for neutralization of hydrocalcium sulfite:
  Density of hydrocalcium sulfite salvaged: 7% by weight
  Density of calcium hydroxide: 10% by weight
  Indicator: phenolphthalein
(d) Characteristic of porous polyolefin sheet:
  Tear resistance: 440 g.
  Moisture permeability: 750 g./m.²/24 hrs.

Example 11

(a) Condition for preparing a polyolefin resin sheet:
  Compounding ratio:
    Polyethylene (commercially available, prepared at medium low pressure): 15.0% by weight
    Calcium sulfite (grain size: 1.0–3.0μ): 82.5% by weight
    Ethylene-propylene rubber: 2.5% by weight
  Utilized rolls:
    Diameter of the rolls: 89 mm.; length, 200 mm.
    Revolution ratio: 1.2
    Temperature on the surface of rolls: 160±5° C.
    Roll clearance: 0.2 mm.
    Thickness of sheet: 0.2 mm.
(b) Condition for dissolution of calcium sulfite:
  Dimension of sheet: width, 150 mm.; thickness, 0.2 mm.
  Reaction tank: 200 x 400 x 200 mm.
  Quantity of SO₂ to be blown in: 0.4 liter/min.
  Time for soaking: 30–40 minutes
  Temperature: 10–20° C.
  Dissolution ratio: 99.0%
(c) Condition for neutralization of hydrocalcium sulfite:
  Density of hydrocalcium sulfite salvaged: 7% by weight
  Density of calcium hydroxide: 10% by weight
  Indicator: phenolphthalein
(d) Characteristic of porous polyolefin resin sheet:
  Tear resistance (mean value): 350 g.
  Moisture permeability: 820 g./m.²/24 hrs.

Example 12

(a) Preparation of calcium sulfite:
  Calcium hydroxide:sulfur dioxide=62:53 (by weight)
  Reaction density: 20% by weight of water suspension
  Blowing pressure of sulfur dioxide: 5–10 mm. Hg
  Reaction temperature: 80° C.
  Reaction time: 3 hrs.
(b) Condition for forming polyolefin resin sheet:
  Utilized roll: twin rolls
    Diameter, 89 mm.; length 200 mm.
    Revolution ratio: 16:19
  Compounding ratio:
    Polyethylene (commercially available, prepared at medium low pressure): 27% by weight
    Styrene-butadiene rubber: 2.5% by weight
    Calcium sulfite: 70.5% by weight
  Processing temperature: 160±5° C.
  Processing time: 10–15 minutes
  Roll clearance: 0.2 mm.; thickness of sheet, 0.2 mm.
(c) Condition of acid treatment:
  Kind of acid and density: 10% by weight of HCl aqueous solution
  Treating temperature: 90° C.
  Treating time: 30 seconds
(d) Characteristic of porous polyolefin resin sheet:
  Tear resistance (mean value): 440 g.
  Moisture permeability: 750 gr./m.²/24 hrs.

What we claim is:

1. A method for preparing a porous polyolefin resin sheet, which comprises: kneading a polyolefin resin with 20 to 90% by weight of particles of a material selected from the group consisting of calcium sulfite, calcium sulfite and mixtures thereof; forming the resulting kneaded mixture into a sheet; and soaking the sheet in an aqueous solution of an inorganic acid selected from the group consisting of hydrochloric acid and nitric acid, and thereby dissolving said particles out of the sheet whereby to obtain a porous sheet.

2. A method according to claim 1, wherein said particles are not more than 200 microns in diameter.

3. A method according to claim 1, wherein said aqueous solution contains from about 2 to 15% by weight of said acid and further contains from about 0.1 to 1.0% by weight of a quaternary ammonium halide cationic surface active agent.

4. A method for preparing a porous polyolefin resin sheet which comprises kneading polyolefin resin with 20 to 90% by weight of calcium sulfite particles, forming the resulting kneaded mixture into a sheet, soaking the sheet in an aqueous hydrochloric acid solution thereby dissolving calcium sulfite particles out of said sheet to obtain a porous sheet, then adding sulfuric acid into said hydrochloric acid solution containing calcium sulfite dissolved from said sheet thereby producing calcium sulfate and hydrogen chloride, then recovering said calcium sulfate from said solution and absorbing said hydrogen chloride into said hydrochloric acid solution.

5. A method for preparing a porous polyolefin resin sheet which comprises kneading a polyolefin resin with 20 to 90% by weight of calcium sulfite particles, forming the resulting kneaded mixture into a sheet, soaking the sheet in an aqueous solution containing sulfur dioxide thereby converting said calcium sulfite to hydrocalcium sulfite and dissolving same out of said sheet to obtain a porous sheet, then adding calcium hydroxide into said sulfur dioxide aqueous solution containing hydrocalcium sulfite dissolved from said sheet thereby precipitating calcium sulfite and then recovering calcium sulfite particles from said solution.

References Cited

UNITED STATES PATENTS 3,660,551   5/1972   Susuki et al. _____ 264—49
3,536,796   10/1970   Rock _____ 264—49

MELVYN I. MARQUIS, Primary Examiner

U.S. Cl. X.R.

106—40 R, 86, 122; 252—142; 260—2.5 M; 264—45

UNITED STATES PATENT OFFICE
CERTIFICATE OF CORRECTION

Patent No. 3,816,575　　　　　　　　Dated June 11, 1974

Inventor(s) Rinnosuke Susuki, Hiroshi Hoshi, Jiro Saito, Keiichi Murakami and Humio Ito It is certified that error appears in the above-identified patent and that said Letters Patent are hereby corrected as shown below:

Col. 8, line 19; change "sulfite" to ---sulfate---.

Signed and sealed this 29th day of October 1974.

(SEAL)
Attest:

McCOY M. GIBSON JR.　　　　　　　C. MARSHALL DANN
Attesting Officer　　　　　　　　　Commissioner of Patents